Dec. 9, 1969   D. A. NEISH ET AL   3,482,436
VIBRATION RESPONSIVE APPARATUS
Filed Feb. 13, 1967
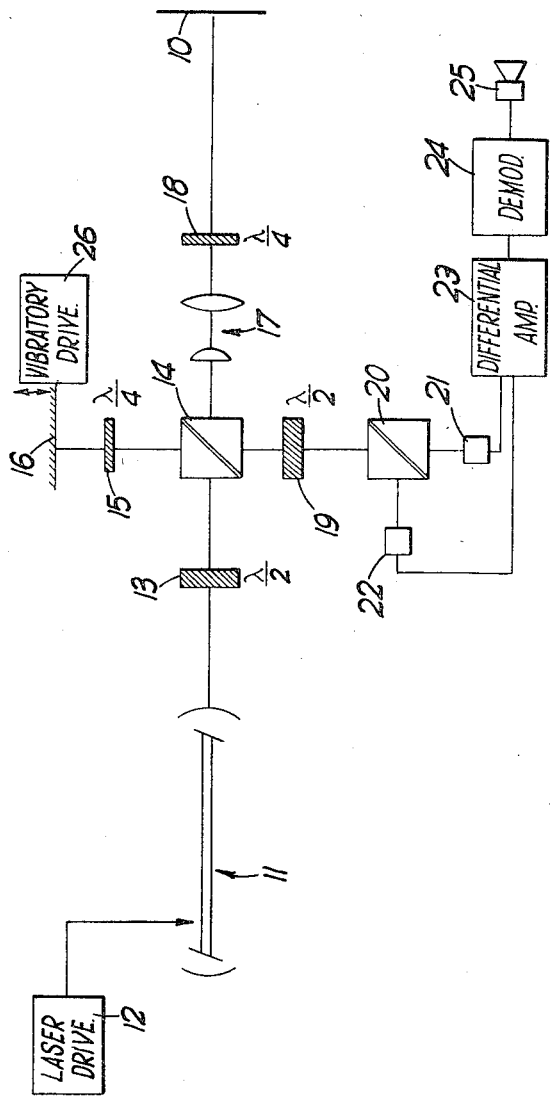

United States Patent Office 3,482,436
Patented Dec. 9, 1969

3,482,436
VIBRATION RESPONSIVE APPARATUS
David Anthony Neish and Stephen Charles Lauder Botcherby, London, England, assignors to Decca Limited, London, England, a British company
Filed Feb. 13, 1967, Ser. No. 615,683
Claims priority, application Great Britain, Feb. 16, 1966, 6,902/66
Int. Cl. G01n 29/04
U.S. Cl. 73—71.3                              11 Claims

ABSTRACT OF THE DISCLOSURE

The invention concerns a Doppler apparatus in which a laser beam is directed onto a vibrating object and variations in the Doppler beat frequency produced by the vibration are detected to reproduce the vibration's waveform. The light from the laser is directed at a surface of the object and mixed in a balanced optical mixer with light directly from the laser. A detector receives the output from the mixer. A vibrating mirror shifts the frequency of the light which is applied from the laser directly to the balanced mixer.

---

This invention relates to vibration responsive apparatus and has for its principal object to provide an improved means for detecting or measuring vibratory movement of an element without requiring any physical contact with that element.

According to this invention, vibration responsive apparatus comprises a laser giving a beam of coherent light for directing on to an element the vibration of which is to be detected, a mixer for mixing light reflected from the element with light from the laser, detector means for converting the output of the mixer into electrical signals, means responsive to changes in the output of said detector means and means for introducing into the optical system modulation to shift relatively the said light from the laser and the light reflected from the element by a frequency greater than the greatest Doppler shift produced by the movement of the element.

It is known to use a laser for measuring the speed of movement of a body by directing the laser beam on to the body and determining the Doppler beat frequency between the light from the laser and reflected light. In the arrangement of the present invention, on the other hand, the changes in the output are utilized. The apparatus may be used for example for determining the frequency and/or the amplitude of vibration of a body, e.g. an element in a structure, which is not directly accessible. It is readily possible for example to use the apparatus to detect vibration of a body at a very high temperature or a body such as an overhead cable where physical access is inconvenient. The means responsive to the changes in output of the detector means may comprise an indicator or a recorder responsive to changes in the frequency of the detector output or responsive to changes in the amplitude of the detector output.

In any event, the movement of the element will be sinusoidal or in some way non linear: the instantaneous Doppler frequency would be proportional to the instantaneous velocity of the element with respect to the laser and a varying output from the detector can be used to reproduce the waveform of the vibration: such a waveform could be applied to a spectrum analyser to determine the individual Fourier components of the waveform. This would be particularly suitable if the invention were used to measure vibration of machinery.

The invention, however, finds particular application for picking up speech signals from a distant point; this is done by directing the laser beam on to a body which will vibrate in accordance with the speed signals. As will be apparent from the following description of further features of the invention, the apparatus can be made sensitive to extremely small physical displacements, e.g. of the order of 1 micron, and thus it is merely necessary to direct the beam onto an object, such as a window pane, that will vibrate very slightly in accordance with the acoustic signals.

For speech detection, the aforesaid means responsive to the output of said detector means may comprise an electroacoustic transducer such as a loudspeaker or an audio signal recorder. The signal from the detector means may be amplified before being fed to the transducer or recorder using an amplifier having a band width suitable for speech signals.

The sensitivity of the apparatus may be increased by using an optical system for focusing the light returned from the vibrating body. For this purpose, the light beam from the laser may be passed through a telescope or similar optical focusing device. The vibrating body will tend to scatter the light in various directions and, by using a wide aperture optical system, the scattered light may be focussed for feeding to the mixer with spatial phase coherence.

The mixer preferably is a balanced mixer in which the signals are split and re-combined in such a way that unwanted signals in the laser output cancel out but an output is obtained from any Doppler frequency shifted signals.

The mixer may comprise, for example, a polarisation beam splitter providing a direct beam from the laser with one polarisation and a second beam of orthogonal polarisation which is directed onto the said element and reflected thereby to be fed with the direct beam onto a second polarisation splitter which separates the light signals to feed them to separate photo-electric devices. These in turn can feed a differential amplifier. By arranging the second polarisation splitter to divide each of the two beams into the two components, signals present in one beam only cancel in the differential amplifier. The amplifier however will give an output of signals obtained as the difference frequency between signals in the two incident beams.

The polarisation splitters conveniently each comprise a pair of 45° prisms arranged "back-to-back" with a multilayer variable dielectric film between them. Conveniently one of the beams from the first polarisation splitter is fed through a quarter wave plate to a mirror and so reflected back to the polarisation splitter and the beam to and from the vibrating body is also passed through a quarter wave plate. This construction forms a duplexer in which the returned signal and the reference signal are polarised orthogonally but are coincident. These coincident but orthogonally polarised beams can be fed to the second polarisation splitter, conveniently through a half wave plate to give the necessary polarisation rotation and the two outputs from the second polarisation splitter are fed separately to photo-cells feeding a balanced amplifier. Signals shifted in frequency by the Doppler shift will not cancel and so will give an output from the amplifier.

Other forms of balanced mixer however may be employed for example signals may be obtained from the two ends of the laser, one being directed on to the vibrating body and back to the mixer, whilst the other is directed by a separate path to the mixer.

Although with a system in which the light from the laser and reflected from the element were merely mixed and detected could *detect* vibration, such a system would not be able to reproduce faithfully the waveform of a vibrating object. This arises because the Doppler shift is the same, for the same rate of displacement of the object, whether the object is moving towards or away from the laser. Thus, if the vibrations were sinusoidal, the signal produced after demodulation of the appropriate signals containing the varying Doppler component would be a train of half cycles all of the same polarity. To overcome this disadvantage, it is appropriate to produce a further Doppler frequency shift in the "reference" light from the laser, with which light the received optical signal is compared. In practice this may be achieved by reflecting the reference signal from the laser, before mixing with the reflected light, from a reflector that is moved at a rate greater than (and preferably at least an order of magnitude greater than) the greatest rate of movement of the vibrating surface of the element. Appropriate movement of the surface may be achieved by mounting a mirror, from which the light from the laser is reflected before it is applied to the mixer, on a piezo-electric slab which is energised with a high frequency electric signal. Many other arrangements are possible; in particular the mirror may be moved back and forth at a very low frequency provided that the speed of the movement is fast enough.

With such an arrangement it would be necessary, if low frequency modulation is used, to provide 180° reversal of the output of the detector means each time the mirror reversed its direction of travel to ensure continuity of that output. This may readily be achieved using a switch, operated in synchronism with the drive for the mirror, alternately selecting one of two outputs from a phase splitting amplifier through which the detector's output would be passed.

The aforementioned modulation of the laser light which is compared with the Doppler shifted received light may be introduced by introducing high frequency modulation into the optical system (for example by single side band modulation of that portion of the laser light which is compared with the Doppler shifted received light) to shift relatively the laser light and received light by a frequency greater than any frequency to be detected. The modulation might be introduced using a Kerr cell or by mechanically vibrating a reflector or using a Pockle's effect modulator. Photo-electric cells are usually noisy at low frequencies; by introducing the modulation, amplification of the required signals can be effected by using a pre-amplifier tuned to the modulation frequency before feeding the signals to the detector system. The use of such a high frequency modulation thus enables a further substantial increase in sensitivity to be obtained as well as facilitating faithful reproduction of the vibration waveform.

The following is a description of one embodiment of the invention, reference being made to the accompanying drawing which illustrates a speech signal detection system.

Referring to the drawing, a surface 10 is assumed to vibrate in response to incident speech signals which are to be detected. A gas laser 11 is energised from a laser drive 12. The output beam from the laser passes through a half wave plate 13 to a polarisation beam splitter 14 comprising a polarising prism system having two 45° prisms back-to-back with a variable dielectric material between them. This divides the beam from the laser 11, which is plane polarised at an arbitrary angle into first and second components polarised in orthogonal planes. One component is deflected by the prism through a quarter wave plate 15 onto a mirror 16 which reflects it back through the quarter wave plate 15. This plate gives a total polarisation rotation of 90° so that this component passes straight through the beam splitting prism 14. The orthogonally polarised component passes from the beam splitter through a telescope system 17 and a quarter wave plate 18 to the surface 10. The light reflected therefrom and scattered thereby is collected by the telescope system 17 and returned to the beam splitting prism 14 where it will be reflected so as to be coincident with the first component. The combined signals are passed through a further half wave plate 19 to a second beam splitting prism system 20 which separates the light beam into two components. The beam splitter 20 is similar to the beam splitter 14 and consists of two 45° prisms back-to-back with a variable dielectric material between them. The half wave plate 19 introduces a polarisation rotation of 45° and is provided so that the two prisms 14 and 20 are physically aligned instead of having to be at an angle to one another in order to have each beam at the second prism split into two orthogonally polarised components. These components from the second prism 20 are separately sensed by photoelectric cells 21 and 22. The Doppler frequency signals are out of phase at the outputs of the photo-cells 21, 22 and can therefore be added by a differential amplifier 23 whereas spurious laser frequencies are cancelled. The light signals are modulated at a high frequency by mechanical vibration of the mirror 16 normal to the plane of the mirror through a fraction of a wavelength, e.g. $\frac{1}{3}\lambda$. This vibration is effected by a vibrating drive 26 of any convenient type. Since the modulation is introduced into one component only from the first polarisation splitter, this modulation frequency appears also in the amplifier output. The modulation frequency may be chosen to be much higher than the Doppler shift variations to be detected. The amplifier 23 is tuned to this modulation frequency. The output of the amplifier 23 is demodulated by an audio frequency detector 24 (such as a frequency discriminator whose centre frequency is the modulation frequency) and fed to a loudspeaker 25 or a recorder.

If the modulating frequency introduced by the drive 26 were lower than the expected range of Doppler frequencies then the output of the detector 24 would be applied to the input of a phase splitting amplifier. The outputs of the amplifier (in phase opposition) would be alternately selected by a synchronous switch 28 and the selected output fed to the loudspeaker 25 or a recorder. The switch would be operated by or from the drive 26 to change the selected output each time the direction of movement of the mirror reverses.

Care must be taken to choose the amplitude and frequency of vibration of the mirror, having regard to the expected type of vibration of the object, to ensure that the output signal from the detector represents unambiguously the vibration of the object.

We claim:

1. Vibration responsive apparatus comprising a laser giving a beam of coherent light for directing onto an element the vibration of which is to be detected, optical signal combining means for combining light reflected from the element with light from the laser, detector means for converting the output of the combining means into electrical signals, said detector means including demodulator means coupled to receive said electrical signals for demodulating said electrical signals, means coupled to receive the output of said demodulator means, responsive to changes in the output of said demodulator means and means for introducing into the optical system modulation to shift relatively the said light from the laser and the light reflected from the element by a frequency greater than the greatest Doppler shift produced by the movement of the element.

2. Apparatus as claimed in claim 1 wherein said means responsive to changes in the output of the detector means comprises an indicator or recorder responsive to changes in the frequency of the detector output.

3. Apparatus as claimed in claim 1 wherein said means responsive to changes in the output of the detector means comprises an indicator or recorder responsive to changes in the amplitude of the detector output.

4. Apparatus as claimed in claim 1 wherein said means responsive to changes in the output of the detector means comprises an electro-acoustic transducer.

5. Apparatus as claimed in claim 1 wherein an optical system is provided to focus the light reflected from said element.

6. Apparatus as claimed in claim 1 wherein the optical signal combining means comprises a first polarisation beam splitter providing a direct beam from the laser with one polarisation and a second beam of orthogonal polarisation which is directed onto said element and reflected thereby to be fed with the direct beam to a second polarisation beam splitter, said second polarisation beam splitter dividing each of the beams into transmitted and deflected components, a first photo-electric device disposed to receive said transmitted components and a second photo-electric device disposed to receive said deflected components; said detector means comprising means for obtaining the difference of the outputs of said photo-electric devices.

7. Apparatus as claimed in claim 6 wherein each polarisation beam splitter comprises a pair of 45° prisms arranged back-to-back with a multi-layer variable dielectric coating between them.

8. Apparatus as claimed in claim 6 comprising a quarter wave plate through which the direct beam from the first polarisation beam splitter is fed to a mirror and reflected back to the first polarisation beam splitter and a further quarter wave plate through which the beam to and from the vibrating element is also passed.

9. Apparatus as claimed in claim 6 comprising a reflector from which said light from the laser is reflected before it is applied to the optical signal combining means and vibrating means for vibrating said reflector.

10. Apparatus as claimed in claim 9 wherein the frequency of vibration of the reflector is greater than the highest Doppler shift produced by movement of the element.

11. Vibration responsive apparatus comprising a laser giving a beam of coherent light, means for directing a part of said beam of coherent light onto an element the vibration waveform of which is to be reproduced, optical signal combining means for combining light reflected from the element with a further part of said beam of coherent light, detector means for converting the output of the combining means into electrical signals said output containing a varying component proportional to the instantaneous velocity of said element, said detector means including demodulator means coupled to receive said output to extract said varying component, waveform producing means coupled to said demodulating means and responsive to said varying component to reproduce said vibration waveform, a reflector disposed to reflect said further part of said beam of coherent light towards said optical signal combining means, and vibrating means for vibrating said reflector to shift said further part of said beam of light by a frequency greater than the maximum possible frequency of said varying component.

References Cited

UNITED STATES PATENTS 3,360,987   1/1968   Flower et al. _____ 73—71.3

JAMES J. GILL, Primary Examiner